Patented July 1, 1947

2,423,231

UNITED STATES PATENT OFFICE 2,423,231

REFRACTORY CEMENTS AND PROCESSES FOR THEIR PREPARATION

Robert Esnault-Pelterie, Geneva, Switzerland, assignor to AGEV Aktiengesellschaft für Erfindungsverwertung, Vaduz, Liechtenstein (Princedom of Liechtenstein), a corporation of the Princedom of Liechtenstein.

No Drawing. Application April 4, 1945, Serial No. 586,635. In Switzerland April 27, 1944

2 Claims. (Cl. 106—65)

The present invention relates to a refractory cement which can be employed as an adhesive coating for protecting metallic surfaces, as a mortar for assembling refractory bodies, for example, in the construction of furnaces, boilers, or also for binding more or less granular refractory powders, especially silica, alumina, oxides, sulphides, carbides, carbons (graphite), silicides, silicates, carbonates, etc.

This cement is characterised in that the proportions of alkaline metal oxide or oxides, of silica and of alumina contained in its constituents are comprised between, on the one hand, 1 molecule of alkaline oxide for 1 molecule of alumina and 1 molecule of silica and, on the other hand, 1 molecule of alkaline oxide for 1 molecule of alumina and 5 molecules of silica.

The alkaline oxide or oxides that this cement contains may be one or several of the oxides $K_2O$, $Na_2O$, $Li_2O$, $Cs_2O$, or $Rb_2O$.

The cement according to the invention already sets through evaporation of the water it contains or which is added to it, and becomes very hard when baked. It resists temperatures as high as 3100° F. (1700° C.).

The invention also comprises a process for the preparation of this refractory cement; this process is characterized in that at least two different components are thoroughly mixed so as to obtain a mixture in which the proportions of alkaline oxide or oxides, of silica and of alumina are comprised between, on the one hand, 1 molecule of alkaline oxide for 1 molecule of silica and 1 molecule of alumina and, on the other hand, 1 molecule of alkaline oxide for 1 molecule of alumina and 5 molecules of silica.

A particularly satisfactory composition of the cement to which the present invention relates is that in which the proportions of the constituents as considered in the anhydrous state correspond to 1 molecule of alkaline oxide for 1 molecule of alumina and 3 molecules of silica. A cement of this composition and in which the alkaline oxide consists of potassium oxide, may be prepared by mixing kaolin and silicate of potassium in such a proportion that the mixture contains an equal number of molecules of kaolin and potassium silicate as considered in the anhydrous state.

*Example 1*

A cement of the following composition:

$K_2O.Al_2O_3.3SiO_2$ is particularly satisfactory and easy to make. It may be prepared by mixing kaolin and potassium silicate in such a proportion that the mixture contains an equal number of molecules of anhydrous kaolin of medium composition ($Al_2O_3.2SiO_2$) and of molecules of anhydrous potassium silicate ($K_2O.SiO_2$).

A less acid cement is obtained by the addition of more or less hydrated alumina, a more acid one by the addition of hydrated silica.

In the case in which the cement contains both potassium and sodium oxides, it may be prepared by mixing kaolin powder (anhydrous or not) with a solution containing several alkaline silicates.

The silicate or silicates may be added in the form of an aqueous solution to at least one pulverulent component containing $Al_2O_3$; the cement is thus obtained in the form of a paste, ready for use.

Such a paste may contain more or less water according to the water contents of the aqueous solution used for its preparation. When too fluid, said paste may be thickened by addition of powdered refractory materials, such as carborundum, corundum, etc., so giving a highly valuable cement, which may be called "secondary cement" in order to differentiate it from the fundamental cement above described which also serves as a binder for this secondary cement.

*Example 2*

Kaolin is mixed with an aqueous solution containing 27% of potassium silicate; the relative quantities of kaolin and of the solution are such that the resulting mixture contains an equal number of molecules of anhydrous kaolin of medium composition ($Al_2O_3.2SiO_2$) and of molecules of anhydrous potassium silicate ($K_2O.SiO_2$). The mixture obtained which contains much water is too fluid for being directly used as a cement; powdered carborundum is then added in a quantity sufficient for obtaining a paste of the desired consistency. This paste is allowed to rest for 24 hours and is then ready to be used as a cement, particularly for binding refractory bricks.

What I claim is:

1. A refractory cement consisting of a mixture of kaolin and potassium silicate in such molecular proportions that it substantially corresponds to the formula $K_2O.Al_2O_3.3SiO_2$.

2. That step in the process of making a refractory cement which consists in mixing anhydrous kaolin with an approximately 27% aqueous solution of potassium silicate in such proportions that the resulting mixture contains an approximately equal number of molecules of kaolin and of anhydrous potassium silicate.

ROBERT ESNAULT-PELTERIE.

REFERENCES CITED

The following references are of record in the file of this patent:

UNITED STATES PATENTS

| Number | Name | Date |
|---|---|---|
| 2,160,873 | Kerla | June 6, 1939 |
| 816,271 | Steward | Mar. 27, 1906 |
| 1,924,311 | Frey | Aug. 29, 1933 |
| 1,999,382 | Weygandt | Apr. 30, 1935 |

FOREIGN PATENTS

| Number | Country | Date |
|---|---|---|
| 137,850 | Austria | 1934 |
| 247,055 | Italy | 1926 |
| 23,678 | Netherlands | 1931 |

OTHER REFERENCES

Searle: Refractory Materials, 2nd ed. (1924), pgs. 588–589.